United States Patent [19]
Crawley

[11] Patent Number: 5,642,751
[45] Date of Patent: Jul. 1, 1997

[54] VALVE ASSEMBLY

[76] Inventor: Michael F. Crawley, 317 Calderwood Hwy., Maryville, Tenn. 37801

[21] Appl. No.: 528,345

[22] Filed: Sep. 14, 1995

[51] Int. Cl.$^6$ .............................. F16K 49/00; F16K 25/00
[52] U.S. Cl. ..................... 137/340; 251/172; 251/214; 251/298; 251/368
[58] Field of Search .......................... 137/340; 251/298, 251/172, 144, 214, 368

[56] References Cited

U.S. PATENT DOCUMENTS

| | | | |
|---|---|---|---|
| 2,705,016 | 3/1955 | Saap | 137/340 |
| 4,137,935 | 2/1979 | Snowdon | 137/242 |
| 4,292,992 | 10/1981 | Bhide | 251/172 |
| 4,353,388 | 10/1982 | Isoyama et al. | 137/340 |
| 4,688,594 | 8/1987 | Gardner et al. | 137/340 |
| 4,715,400 | 12/1987 | Gardner et al. | 137/340 |

OTHER PUBLICATIONS

Macawber —Denseveyor brochure, 4 pages, 1975.

*Primary Examiner*—A. Michael Chambers
*Attorney, Agent, or Firm*—Luedeka, Neely & Graham, P.C.

[57] ABSTRACT

This invention relates to a valve assembly for granular and/or abrasive materials. The valves comprises a housing having an inlet and an outlet wherein the ratio of the outlet diameter to inlet diameter is no less than 1:1 for unrestricted flow of materials through the valve assembly. There is an annular recess in the housing adjacent the valve seat containing a resilient inflatable sealing ring, the ring being dimensioned so as to sealably contact the closure member when the closure member is in the first position upon inflation of the ring. A fluid inlet supplies a fluid under pressure to the sealing ring to inflate the sealing ring. A shaft channel and contains an external hub disposed on the outer end of the shaft which hub is dimensioned and arranged so as to engage the housing to restrict longitudinal movement of the shaft in the channel. The hub is connected to the outer end of the shaft by axial connection means which engages the hub and shaft together so as to restrict axial movement of one with respect to the other in a manner which limits the imposition of any radially directed impact forces upon the shaft associated with connection of the hub to the shaft.

25 Claims, 4 Drawing Sheets

VIEW A-A

Fig. 3A

VIEW B-B

Fig. 3B

VIEW C-C

Fig. 3C

VIEW D-D

VIEW A-A

VALVE ASSEMBLY

FIELD OF THE INVENTION

The invention relates to a valve assembly and in particular to valve assemblies for use in conveying dry granular or abrasive materials at high pressures and temperatures.

BACKGROUND

Angle of repose valves have typically been used for granular materials in order to interrupt the flow of granular material. While these valves can be adapted for use at high temperatures, the valves may not provide a sufficiently gas tight closure, and for many applications must ba used in combination with a secondary sealing valve when gas-tight closure is required.

An improvement in the handling of granular or abrasive materials was achieved with an inflatable seat valve having a spherical shaped shell closure for interrupting the flow of granular materials. U.S. Pat. No. 4,137,935 describes such a valve assembly. Typically, such inflatable seat valves are not suitably designed for very high pressure and/or high temperature applications involving pressures in the range of from 200 to about 400 psi (1.4 to about 2.8 MPa) and/or temperatures in the range of from about 150° C. to about 250° C.

Accordingly, it is an object of the invention to provide an improved inflatable seat valve for handling granular and/or abrasive materials.

Another object of the invention is to provide a valve assembly which performs satisfactorily at temperatures as high as about 350° C.

Yet another object of the invention is to provide an improved inflatable seat valve assembly which performs well in applications involving pressures as high as about 600 psi (4,000 kPa).

A further object of the invention is to provide a valve assembly having an inflatable seat for applications involving pressures as high as about 600 psi (4,000 kPa) and temperatures as high as about 350° C.

An additional object of the invention includes provision of a valve assembly which may be assembled in a manner which enables the use of precision machined parts for high pressure applications without imposing any significant radially directed impact forces upon the shaft, bearings and seals.

Still other objects of the invention will be evident from the ensuing description and appended claims.

SUMMARY OF THE INVENTION

With regard to the foregoing and other objects, the present invention is directed to an improved valve assembly for handling granular or abrasive materials at high temperatures and/or pressures. According to its more general aspects, the invention provides a valve assembly containing a housing which includes an inlet and an outlet wherein the ratio of the outlet diameter to inlet diameter is no less than 1:1 for unrestricted flow of materials, particularly granular materials, through the valve assembly. The valve also includes a spherical closure member within the housing and a valve seat with which the closure member matably engages in a first position in closing relationship with the outlet. An elongated shaft is drivably connected to the closure member for rotating the closure member about the shaft axis between a second position in an open relationship with the outlet and the first position to facilitate a flow of material therethrough from the inlet to the outlet of the valve assembly by rotation of the shaft to move the closure member between the first and second positions. The valve further includes an annular recess in the housing adjacent the valve seat containing a resilient inflatable sealing ring which sealing ring is dimensioned so as to sealably contact the closure member when the closure member is in the first position upon inflation of the ring. There is also provided a fluid inlet for supplying a fluid under pressure to the sealing ring to inflate the same. A shaft channel is provided in the housing containing a shaft seal and a shaft bearing each having apertures therein for receiving the shaft therethrough in the shaft channel to provide sealed rotation of the shaft about the shaft axis with respect to the housing. An external hub is disposed on an outer end of the shaft projecting from the shaft channel. The external hub is dimensioned and arranged so as to engage the housing to restrict longitudinal movement of the shaft in the channel. The hub is connected to the outer end of the shaft by axial connection means which engages the hub and shaft together so as to restrict axial movement of the one with respect to the other in a manner which limits the imposition of any radially directed impact forces upon the shaft associated with connection of the hub to the shaft.

In a preferred embodiment, the valve assembly also contains at least one resilient shaft retaining ring for retaining the shaft in the shaft channel of the housing at an essentially fixed first axial alignment position relative to the shaft channel. In a further embodiment, the valve assembly also contains at least one resilient bearing retaining ring for retaining the shaft bearing in the shaft channel at an essentially fixed second axial alignment position relative to the shaft channel.

In a particularly preferred embodiment, the axial connection means comprises at least one bolt projecting axially from the hub and threadably received within a threaded opening in the shaft so that the hub is connected to the shaft by an axially directed force to limit imposition of radially directed impact forces upon the shaft associated with connection of the hub to the shaft.

In still another particularly preferred embodiment for high temperature and high pressure applications, the valve assembly contains cooling fluid channels through the shaft and external hub. The cooling fluid channels are in fluid flow communication with a cooling fluid channel in the closure member to thereby enable circulation of a cooling fluid from outside the hub into and through the closure member. In order to protect the sealing ring from the adverse effects of high temperature, a cooling fluid channel in the housing adjacent to the sealing ring may also be provided.

Other embodiments will be evident from the description and appended claims.

BRIEF DESCRIPTION OF THE DRAWINGS

Other features of the invention will now be further illustrated in conjunction with the accompanying drawings in which.

DETAILED DESCRIPTION OF THE INVENTION

Figure 1:
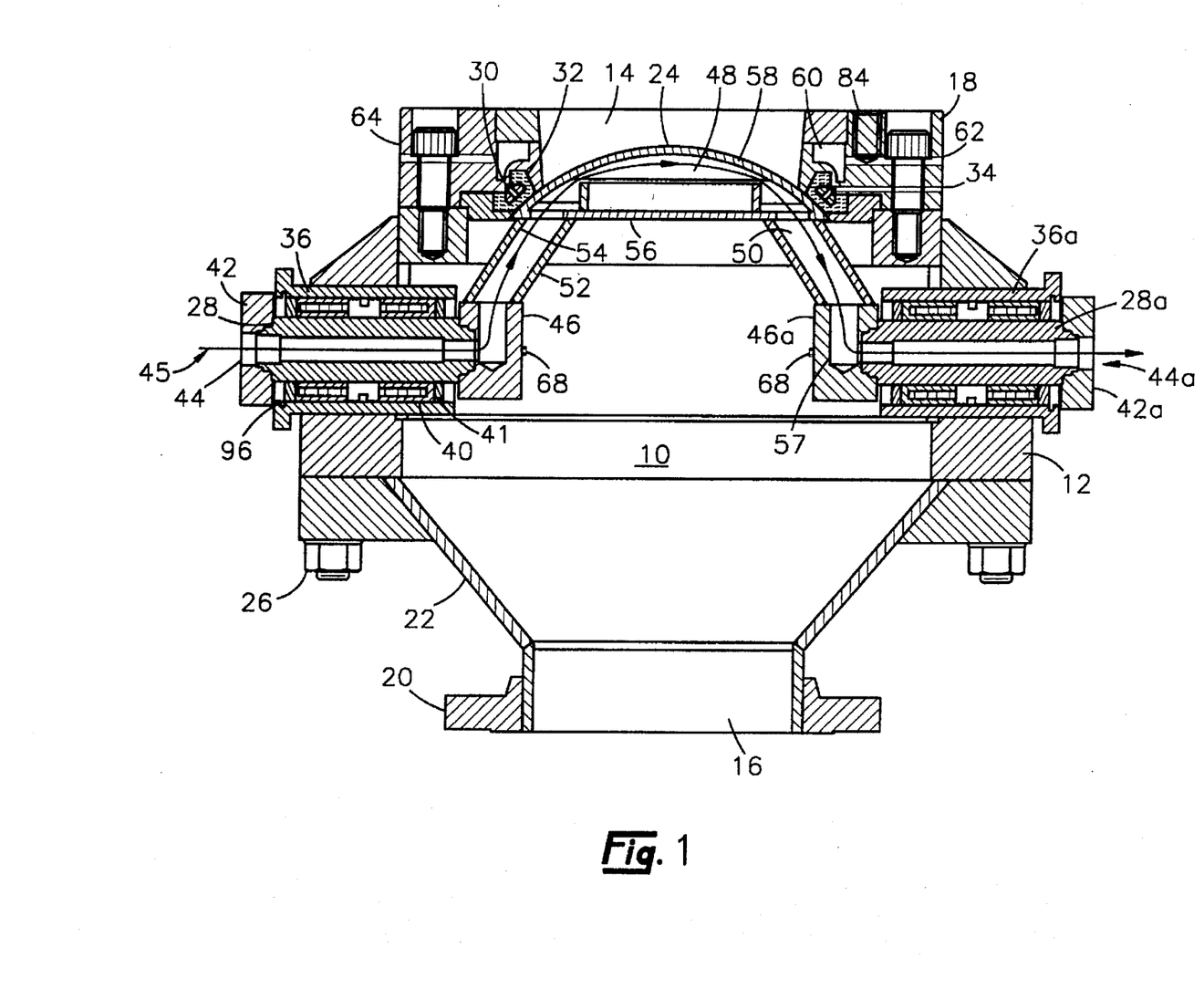
FIG. 1 is a typical cross-sectional view, not to scale, of one valve assembly of this invention showing the valve in the closed second position.

With reference to FIG. 1, a high pressure valve assembly 10 is illustrated. The valve assembly 10 contains a housing 12 having an inlet 14 having an inlet flange 18 and an outlet 16 having an outlet flange 20 for ingress and egress of material through the valve. Preferably the valve inlet 14 and valve outlet 16 are circular wherein the ratio of the outlet diameter to the inlet diameter is no less than 1:1. A more preferred ratio of outlet diameter to inlet diameter is no more than 1.5:1 and most preferably, no more than 1:1. Preferably the inlet flange 18 is a pressure-rated flange for mating the inlet 14 to a standard pressure-rated vessel or pipeline flange. By "standard pressure-rated" means any flange meeting the API, ASA, ANSI, or ASME standards for pressure-rated pipelines or vessels. Likewise, the outlet 16 contains an outlet flange 20, preferably a pressured-rated outlet flange for mating the outlet 16 to a standard pressure-rated vessel or pipeline flange.

Conical section 22 is an inverted truncated conical housing member wherein the apex of the conical section 22 is attached to outlet flange 20 and the base of the conical section 22 is attached to the valve housing 12 using connectors 26. Conical section 22 provides an area between the inlet 14 and outlet 16 for free movement of closure member 24 within the valve housing 12 when the closure member 24 is in the second open position. When in the first closed position as illustrated in FIG. 1, the closure member 24 provides a means for blocking flow of material through the valve from the inlet 14 to the outlet 16.

An elongated shaft 28 is drivably connected to a mount 46 which in turn is attached to the closure member 24 for rotating the closure member about the shaft axis between a second position in open relationship with the outlet 16 and the first position whereby the flow of material through the valve assembly from the inlet 14 to the outlet 16 is facilitated.

An annular recess 30 in the valve assembly housing 12 adjacent the valve seat contains a resilient inflatable sealing ring 32, which sealing ring may be inflated to contact a convex surface 58 of the spherical closure member 24 in order to provide a gas tight seal when the closure member 24 is in or is rotated to the first position. A pressurized fluid inlet 34 is provided as a bore in the valve assembly housing 12 for supplying a fluid under pressure, preferably a gas, to inflate the resilient sealing ring 32. Fluids which may be used to inflate the sealing ring include gases and liquids, preferably gasses, and most preferably inert gases such as air, nitrogen, argon, helium, and the like. When the pressure is released from the sealing ring, the sealing ring 32 will move by its own resilience to a deflated position within the annular recess of the valve housing. In the deflated position, the sealing ring 32 is protected from contact and abrasion by fluid passing through the valve.

The sealing ring 32 is suitably dimensioned within the housing recess so as to contact the convex surface 58 of the closure member 24 when the closure member 24 is in the first closed position and the sealing ring 32 is inflated by fluid pressure. The sealing ring 32 may be formed from any elastomeric material which is compatible with the fluid passing through the valve. For example, the sealing ring may be formed from natural or synthetic rubber, ethylene-propylene diamine monomer, VITON resin, silicon resin, TEFLON resin, polyurethane, NORDEL resin (elastomer based on an ethylene-propylene-hexadiene terpolymer), and the like. The material of the sealing ring should be selected such that the ring will easily deform about any small particles located between the sealing ring 32 and the closure member 24 thereby providing a gas tight seal.

The sealing ring 32 is secured within an annular recess in the valve housing 12 so that the sealing ring does not slide within the recess, thus preventing the ingress of particles of material which may otherwise find their way between the sealing ring 32 and the supporting housing thus causing deterioration of the ring.

A channel 36 is attached to the valve housing 12 and provides for acceptance of the shaft 28. The shaft channel 36 preferably contains at least one shaft seal 41 and preferably at least one shaft bearing 40. Each of the shaft seal 41 and shaft bearing 40 have apertures therein for receiving the shaft 28 therethrough in the shaft channel 36 to provide sealed rotation of the shaft 28 about the shaft axis with respect to the housing 12. For high pressure applications, there is preferably a second shaft channel 36a on the opposing side of the valve housing 12 from the aforementioned shaft channel for receiving an opposing shaft 28a connected to an opposing side of the closure member through an opposing mount 46a. The second shaft channel also contains at least one shaft seal and at least one shaft bearing. (For simplicity, any description of a shaft, shaft channel, shaft seal, shaft bearing, hubs, connectors, mounts, etc. shall apply to all shafts, shaft channels, shaft bearings, connectors, etc., for the valve assembly).

It is preferred to position the shaft 28 in the valve housing 12 as close as possible to the outlet 16 in order to reduce the total height of the valve assembly. By mounting the shaft 28 close to the outlet 16 the closure member 24 may, in its second position, lie at least partly below the level of the outlet. For example when the valve assembly is mounted on top of a pneumatic conveying pressure vessel and when the valve is in its second, open position a part of the closure member 24 may lie within the top portion of the pressure vessel. Preferably the ratio of the distance between the outlet and inlet of the valve to the inlet diameter is no less than 1:1, most preferably in the range of from about 1:1 to about 1.5:1.

A key feature of the invention is the use of an external hub 42 which is disposed on an outer end of the shaft 28 projecting from the housing 12 in order to improve the safety of the valve in high pressure applications. The external hub 42 is dimensioned and arranged so as to engage the housing 12 and thereby restrict longitudinal movement of the shaft 28 in the channel 36. The external hub 42 is preferably fixedly attached to the shaft 28 by use of at least one axial connection means 68 (FIG. 2) which engages the hub and shaft together so as to restrict axial movement of one with respect to the other in a manner which limits the imposition of any radially directed forces upon the shaft associated with connection of the hub to the shaft. The limitation of radially directed impact forces on the shaft makes it possible to maintain extremely close tolerances between the shaft, bearings and seals and the shaft channel thereby providing a valve assembly more suitably adapted for high pressures applications.

Figure 2:
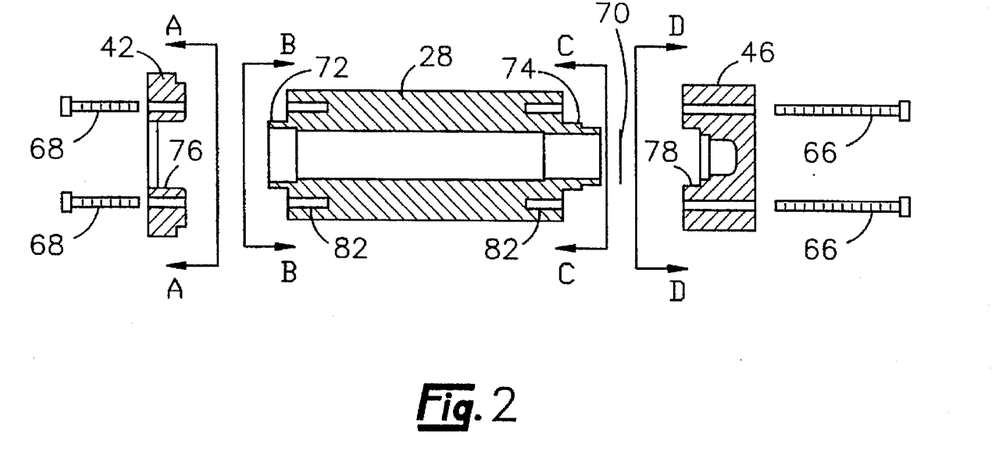
FIG. 2 is an exploded cross-sectional view, not to scale, of a typical shaft, external boss, closure member boss and boss connectors.
Figure 3A:
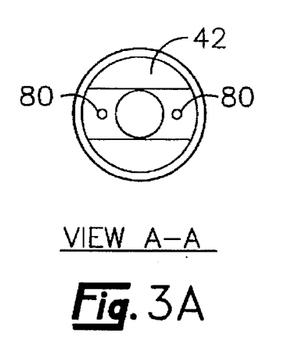
FIG. 3 is a cross-sectional view, not to scale, illustrating the apertures in the bosses and shaft for connecting the bosses to the shaft.
Figure 3B:
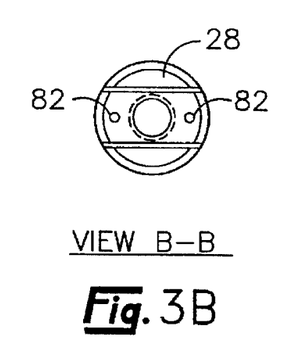
Figure 3C:
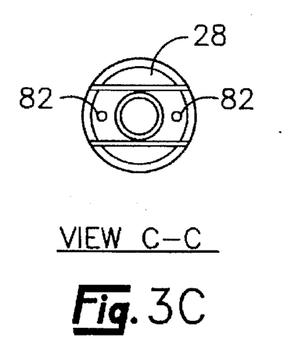
Figure 3D:
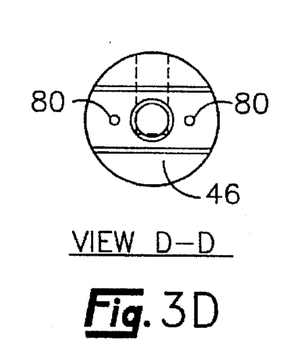

The axial connection means 68 for connecting the external hub 42 to the shaft 28 may include one or more bolts projecting axially from the hub and threadably received within a threaded opening 82 in the shaft. Such one or more bolts provide axially directed forces for connecting the hub to the shaft and limit the imposition of radially directed impact forces upon the shaft. In the alternative, the hub may have a threaded aperture for receiving an externally threaded portion of the outer end of the shaft projecting from the shaft channel. In this alternative, the hub is threaded onto the shaft so that it engages the housing to restrict longitudinal movement of shaft in the channel.

The beforementioned shaft configuration, closure mount and external hub allow for ease of assembly as well as insuring that high tolerances needed for high pressure use of the valve are maintained. Rather than using "C" pins which must be forcibly inserted into the hub, mount and shaft by radially directed impact forces, the external hub and closure mount of this invention are fixedly attached to the shaft by use of axial connection means 66 and 68 (FIG. 2). In a preferred embodiment, the axial connection means 66 and 68 (FIG. 2) are one or more bolts projecting axially from the hub 42 or mount 46 and threadably received within a threaded opening 82 (FIG. 3) in the shaft so that the hub and mount are connected to the shaft by axially directed forces. By using such hub, mount and axial connection means, there is less of a need for the use of "C" pins to rotatably hold the shaft in the channel. Furthermore, misalignment of the shaft and bearings and damage thereto is avoided since the axial connection means does not require applying a radially directed impact force to the shaft as is required when installing "C" pins. Thus a particular advantage of the invention is that the precision parts, particularly the seals and bearings, can be assembled without the use of heavy instantaneous radial loads being applied to the shaft and bearing assembly. Furthermore, it is easier to provide a shaft having a longitudinal cooling fluid channel therethrough since the axial connection means 66 and 68 (FIG. 2) may be positioned such that they do not interfere with the cooling fluid channels in the mount, hub and shaft.

FIG. 1 also illustrates a preferred embodiment of the invention wherein cooling channels are provided for high temperature use of the valve. Accordingly, shaft 28 and external hub 42 contain longitudinal cooling fluid channels 44 to thereby enable circulation of cooling fluid from outside the hub 42 into and through the closure member 24 through mount 46 along flow path 45. In order to facilitate connection of a conduit to the shaft for a cooling fluid, the outer end of each shaft 28 may be provided with a female threaded portion for acceptance of a male threaded conduit or conduit connector.

Closure member 24 also contains cooling fluid channels 48 and 50 formed by channel members 52, 54 and 56 and convex surface 58 of closure member 24. Bore 57 in mount 46 provides a continuous channel for cooling fluid flow from longitudinal channel 44 through channels 50 and 48.

Fluid cooling channel 60 in the inlet flange area of valve assembly 10 provides cooling to the resilient sealing ring 32 and valve seat. Fluid is introduced and removed from fluid channel 60 by cooling fluid inlet 62 and cooling fluid exit 64 positioned preferably on opposing sides of valve assembly housing 12.

Any suitable cooling fluid may be used, either gas or liquid to provide cooling to the closure member, mount and resilient sealing ring of the valve. Particularly useful fluids include water, freon (liquid or gas), brine or any other heat transfer fluid known to those skilled in the art. It is preferred that a liquid cooling fluid be used in order to simplify construction of the valve parts which must contain the fluid.

FIG. 2 illustrates one preferred means for attaching the mount 46 and external hub 42 to shaft 28 particularly when the use of cooling channels is desired. Mount 46 is fixedly attached to closure member 24 (FIG. 1) and is attached to shaft 28 by bolts 66. Likewise, external hub, 42 is attached to shaft 28 by bolts 68. When connecting the hub and mount to the shaft, spacers 70 may be used to achieve proper alignment and tolerances required for high pressure use. Also illustrated in FIG. 2 are tongues 72 and 74 on opposing ends of shaft 28 for alignment with groove 76 of external hub 42 and groove 78 of mount 46. The tongue and groove configuration of the shaft and hub and mount are provided in order to reduce slippage between the hub and mount and the shaft when using bolts as the axial connection means. The tongue and groove configuration of the shaft and hub and mount also provide for positive movement of the shaft and the closure member connected thereto by an actuator that can be attached to the external hub.

FIG. 3 provides an illustration of a typical arrangement of apertures 80 in external hub 42 and mount 46 for acceptance of bolts 66 and 68. Also illustrated in FIG. 3 are bores 82 in opposing ends of shaft 28 for threadably receiving bolts 66 and 68.

Figure 4:
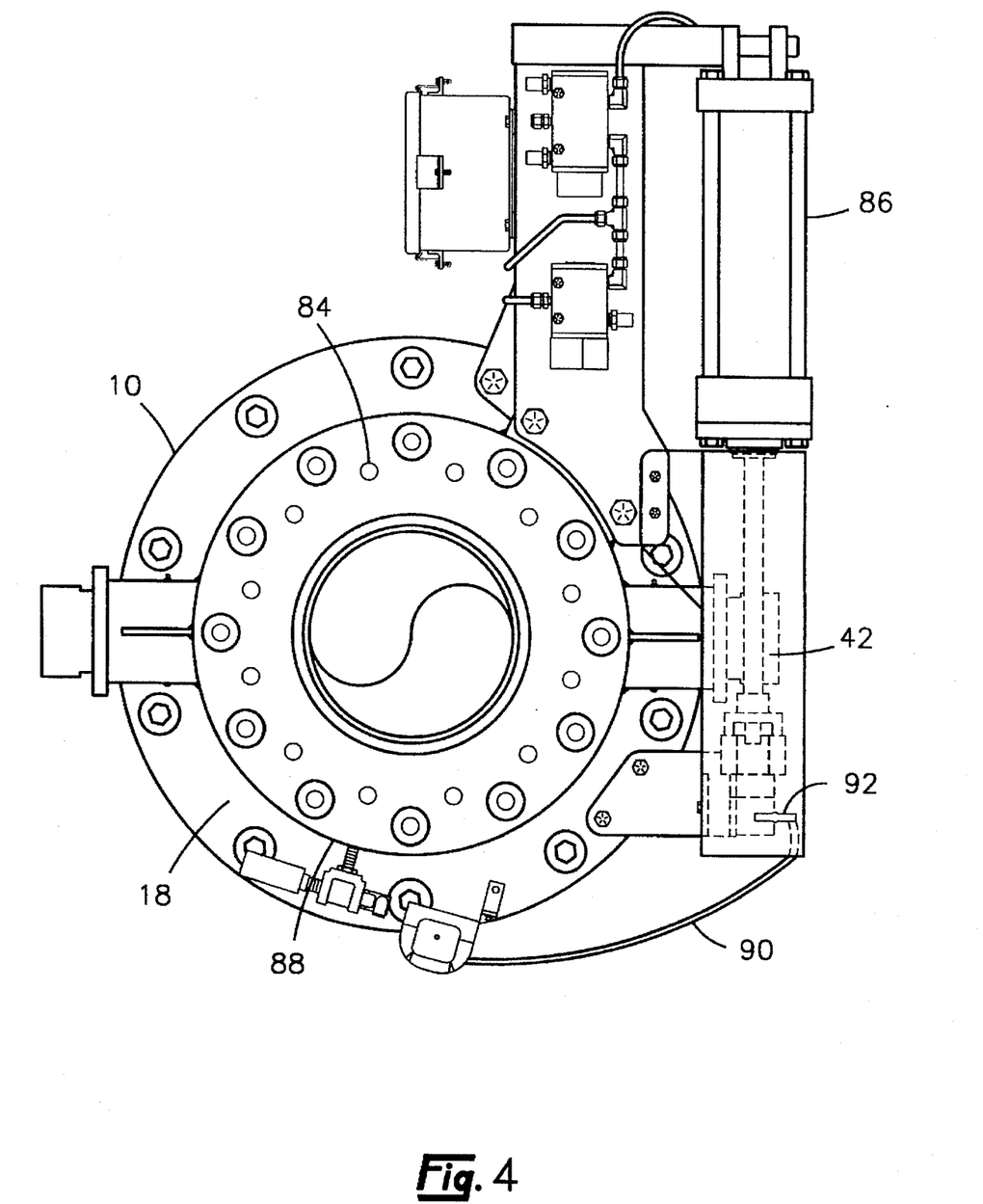
FIG. 4 is a top view, not to scale, illustrating a typical bolt pattern for the inlet of the valve assembly.

In FIG. 4, a view of the valve assembly 10 from the inlet side is illustrated. In this view, the outermost surface of the inlet flange 18 is shown. The inlet flange 18 is preferably a pressure-rated flanged connector having bores 84 for connection of standard pressure-rated vessel or pipeline flanges to the valve assembly. Also illustrated is a typical valve actuator device 86 which can be attached to external hub 42. Such actuator devices are well known in the art and many different types and configuration may be used with the valves of this invention. Provision may be made for providing pressurized air to pressurized fluid inlet 88 through tubing 90 and pneumatic switch 92 whereby the sealing ring is deformed against the convex surface of the closure member when the valve actuator 86 moves the closure member to the closed position.

Figure 5:
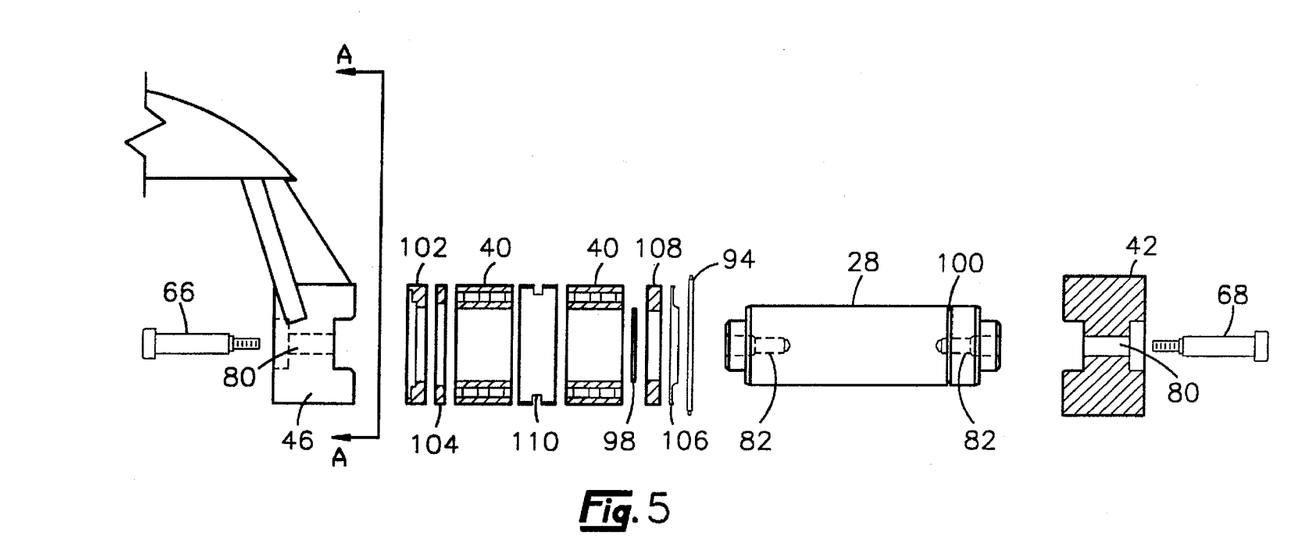
FIG. 5 is an exploded cross-sectional view, not to scale, of a shaft assembly and shaft sealing arrangement.
Figure 6:
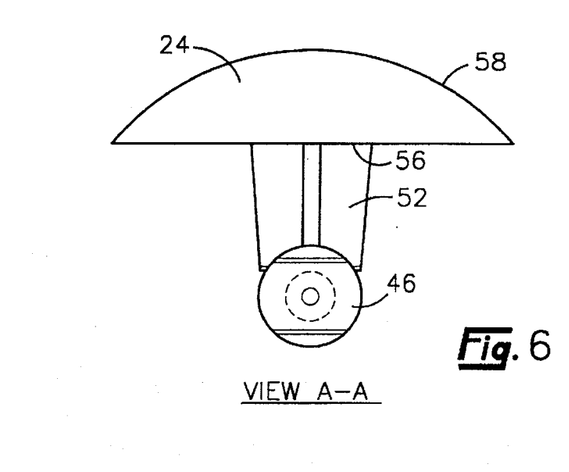
FIG. 6 is a cross-sectional view, not to scale, illustrating one configuration for the closure member.

Another embodiment and various details of the shaft assembly are illustrated in FIGS. 5 and 6. In these figures, the shaft and closure members are not provided with the cooling channels illustrated in FIG. 1. Accordingly, the external hub 42 can be attached to shaft 28 by a single bolt 68 and mount 46 can be attached to shaft 28 by a single bolt 66 through apertures 80 for engagement of threaded openings 82 in shaft 28. Other features of the invention illustrated in FIG. 5 include the bearing retainer ring 94 for retaining the bearings 40 in the shaft channel 36 (FIG. 1) by engagement with circumferential slot 96 (FIG. 1) provided in the shaft channel 36. A bearing spacer 110 provides separation between bearings 40 for more even load distribution of the shaft 28 in the shaft channel 36. A resilient shaft retaining ring 98 fixedly aligns the shaft 28 in the shaft channel 36 by engaging circumferential slot 100 on the shaft. For high pressure applications, pressure seal 102 and secondary seal 104 are provided. Either or both of the pressure and secondary seals can be mechanical seals or packing or a combination of both mechanical seals and packing. An elastomeric lip seal 106 provides further protection against loss of pressure or fluids in a high pressure application of the valve assembly. The elastomeric lip seal is generally formed from a metal ring containing an inner annular elastomeric material. Suitable elastomeric materials include natural and synthetic rubbers, ethylene-propylene diamine monomer, VITON resin, silicon resin, TEFLON resin, polyurethane, NORDEL resin (elastomer based on an ethylene-propylene-hexadiene terpolymer), and the like.

The resilient shaft retaining ring 98 is provided so as to retain the shaft 28 in the shaft channel 36 of the valve housing 12 at an essentially fixed first axial alignment position relative the shaft channel. It is highly preferred to also provide at least one resilient bearing retaining ring 94 for retaining the shaft bearing 40 in the shaft channel 36 at an essentially fixed second axial alignment position relative the shaft channel.

By use of one or both of the resilient retaining rings 94 and 98, the shaft 28 and/or shaft bearing 40 are held in the shaft channel 36 under high pressure conditions in the event that the hub and/or mount axial connection means 66 and/or 68 fail. The bearing retaining ring 94 can be installed by simply compressing the retaining ring while inserting the shaft and bearings in the shaft channel. When the retaining ring, shaft, and bearings reach a predetermined position within the shaft channel, the retaining ring springs back to its original configuration thus engaging a circumferential slot 96 provided on the inside surface of the shaft channel 36. Once engaged, the bearing retaining ring 94 significantly retards axial movement of the bearings in the shaft channel. This allows the shaft, shaft channel, bearings, seals, and the like to be machined to the very close tolerances required for high pressure applications. A shaft retaining ring 98 can also be provided. Such a shaft retaining ring fits into a groove 100 on the shaft and contacts the face of a bearing 40 and/or bearing spacer 108 to prevent axial movement of the shaft provided the bearing retaining ring 94 is also engaged in the groove 96 in the shaft channel.

FIG. 6 is a cross-sectional view of closure member 24, viewed along the axis of the shaft. In this view, the convex surface 58 of closure member 24 is further illustrated. Also shown are mount 46 and structural member 52 depending from mount 46 and fixedly attached to plate 56 supporting the convex surface 58 of closure member 24.

The valve assembly of this invention can be used to restrict the flow of a wide variety of materials including liquids, liquids containing granular or solid particles, as well as essentially dry granular and/or abrasive materials which are conveyed by gravity or pneumatically. The valve assembly and closure member of this invention is similar in form and function to the valve assembly and closure member described in U.S. Pat. No. 4,137,935, incorporated herein by reference as if fully set forth. However, unlike the valve described in U.S. Pat. No. 4,137,935, the valve of this invention can be utilized at pressures above about 250 psi (about 1724 kPa) up to as high as about 600 psi (4,000 kPa). Another embodiment of this invention allows the valve to be utilized at pressures as high as 600 psi (4,000 kPa) and temperatures as high as 350° C.

Having described the invention and its preferred embodiments, it will be recognized that variations of the invention are within the spirit and scope of the appended claims.

What is claimed is:

1. A valve assembly for handling granular or abrasive materials at high temperatures and/or pressures comprising a housing having an inlet and an outlet wherein the ratio of the outlet diameter to inlet diameter is no less than 1:1 for unrestricted flow of materials through the valve assembly; a spherical closure member within said housing; a valve seat within said housing with which the closure member matably engages in a first position in closing relationship with the outlet; an elongated shaft drivably connected to the closure member for rotating the closure member about the shaft axis between a second position in an open relationship with the outlet and the first position to facilitate a flow of material therethrough from the inlet to the outlet of the valve assembly by rotation of the shaft to move the closure member between the first and second positions; an annular recess in the housing adjacent the valve seat containing a resilient inflatable sealing ring, said ring being dimensioned so as to sealably contact the closure member when the closure member is in the first position upon inflation of the ring; a fluid inlet for supplying a fluid under pressure to the sealing ring to inflate said sealing ring; and a shaft channel in said housing containing a shaft seal and a shaft bearing, said shaft seal and shaft bearing having apertures therein for receiving the shaft therethrough in the shaft channel to provide sealed rotation of the shaft about the shaft axis with respect to the housing, said shaft having an outer end projecting from the shaft channel with an external hub disposed on the outer end of the shaft and dimensioned and arranged to engage the housing to restrict longitudinal movement of the shaft in the channel, the hub being connected to the outer end of the shaft by axial connection means which engages the hub and shaft together so as to restrict axial movement of one with respect to the other in a manner which limits the imposition of any radially directed impact forces upon the shaft associated with connection of the hub to the shaft.

2. The valve assembly of claim 1 further comprising at least one resilient shaft retaining ring for retaining the shaft in the shaft channel of the housing at an essentially fixed first axial alignment position within the shaft channel.

3. The valve assembly of claim 2 further comprising at least one resilient bearing retaining ring for retaining the shaft bearing in the shaft channel at an essentially fixed second axial alignment position within the shaft channel.

4. The valve assembly of claim 3 further comprising a longitudinal cooling fluid channel through the shaft and through the hub which cooling fluid channel is in fluid flow communication with a cooling fluid channel in the closure member to thereby enable circulation of a cooling fluid from outside the hub into and through the closure member.

5. The valve assembly of claim 4 further comprising a flanged connector for mating the inlet to a standard pressure-rated flange.

6. The valve assembly of claim 5 further comprising a cooling channel adjacent the resilient sealing ring.

7. The valve assembly of claim 1 further comprising a longitudinal cooling fluid channel through the shaft and through the hub which cooling fluid channel is in fluid flow communication with a cooling fluid channel in the closure member to thereby enable circulation of a cooling fluid from outside the hub into and through the closure member.

8. The valve assembly of claim 1 further comprising a flanged connector for mating the inlet to a standard pressure-rated pipeline flange.

9. The valve assembly of claim 1 further comprising a cooling channel in the housing adjacent the resilient sealing ring.

10. The valve assembly of claim 1 wherein said axial connection means comprises at least one bolt projecting axially from said hub and threadably received within a threaded opening in said shaft so that said hub is connected to said shaft by an axially directed force to limit imposition of radially directed impact forces upon the shaft associated with connection of the hub to the shaft.

11. A high pressure valve assembly comprising in combination:

a housing having an inlet and an outlet wherein the ratio of the outlet diameter to inlet diameter is no less than 1:1, said inlet containing a flanged connector for mating the inlet to a standard pressure-rated flange;

a spherical closure member within the housing;

a valve seat within said housing with which the closure member matably engages in a first position in closing relationship with the outlet;

an elongated shaft drivably connected to the closure member for rotating the closure member about the shaft axis between a second position in an open relationship with the outlet and the first position to facilitate a flow or material therethrough from the inlet to the outlet of the valve assembly by rotation of the shaft to move the closure member between the first and second positions;

an annular recess in the housing adjacent the valve seat containing a resilient sealing ring, said sealing ring being dimensioned so as to sealably contact the closure member when the closure member is in the first position;

a gas inlet for supplying a gas under pressure to the sealing ring to inflate said sealing ring;

a shaft channel in said housing containing a shaft seal and a shaft bearing, said shaft seal and shaft bearing having apertures therein for receiving the shaft therethrough in the shaft channel to provide sealed rotation of the shaft about the shaft axis with respect to the housing; and an external hub disposed on an outer end of the shaft projecting from the shaft channel, said external hub dimensioned and arranged to engage the housing to restrict longitudinal movement of the shaft in the channel, the hub being connected to the outer end of the shaft by axial connection means which engages the hub and shaft together so as to restrict axial movement of one with respect to the other in a manner which limits the imposition of any radially directed impact forces upon the shaft associated with connection of the hub to the shaft.

12. The valve assembly of claim 11 further comprising at least one resilient shaft retaining ring for retaining the shaft in the shaft channel of the housing at an essentially fixed first axial position within the shaft channel.

13. The valve assembly of claim 12 further comprising at least one resilient bearing retaining ring for retaining the shaft bearing in the shaft channel at an essentially fixed second axial position within the shaft channel.

14. The valve assembly of claim 13 further comprising a longitudinal cooling fluid channel through the shaft and through the hub which cooling fluid channel is in fluid flow communication with a cooling fluid channel in the closure member to thereby enable circulation of a cooling fluid from outside the hub into and through the closure member.

15. The valve assembly of claim 14 further comprising a cooling channel in the housing adjacent the resilient sealing ring.

16. The valve assembly of claim 11 further comprising a longitudinal cooling fluid channel through the shaft and through the hub which cooling fluid channel is in fluid flow communication with a cooling fluid channel in the closure member to thereby enable circulation of a cooling fluid from outside the hub into and through the closure member.

17. The valve assembly of claim 11 wherein said axial connection means comprises at least one bolt projecting axially from said hub and threadably received within a threaded opening in said shaft so that said hub is connected to said shaft by an axially directed force to limit imposition of radially directed impact forces upon the shaft associated with connection of the hub to the shaft.

18. A high pressure valve assembly for handling granular materials comprising:

a housing having an inlet and an outlet wherein the ratio of the outlet diameter to inlet diameter is no less than 1:1 and wherein the inlet contains a flange connector for mating the inlet to a standard pressure-rated flange;

a spherical closure member within the housing;

a valve seat within said housing with which the closure member matably engages in a first position in closing relationship with the outlet whereby the path for transfer of granular material from the inlet to the outlet is blocked;

an elongated shaft drivably connected to the closure member for rotating the closure member about the shaft axis between a second position in an open relationship with the outlet and the first position by rotation of the shaft to move the closure member between the first and second positions to provide a path for transfer of granular material from the inlet to the outlet;

an annular recess in the housing adjacent the valve seat containing a resilient inflatable sealing ring, said ring being dimensioned so as to sealably contact the closure member when the closure member is in the first position upon inflation of the ring;

a gas inlet for supplying a gas under pressure to inflate the resilient sealing ring;

a shaft channel in the housing containing a shaft seal and a shaft bearing, said shaft seal and shaft bearing having apertures therein receiving the shaft therethrough in the shaft channel to provide sealed rotation of the shaft about the shaft axis with respect to the housing;

an external hub disposed on an outer end of the shaft projecting from the shaft channel, said hub being dimensioned and arranged to engage the housing to restrict longitudinal movement of the shaft in the channel, the hub being connected to the outer end of the shaft by axial connection means which engages the hub and shaft together so as to restrict axial movement of one with respect to the other in a manner which limits the imposition of any radially directed impact forces upon the shaft associated with connection of the hub to the shaft;

at least one resilient shaft retaining ring for retaining the shaft in the shaft channel of the housing at an essentially fixed first axial position relative to the shaft channel;

at least one resilient bearing retaining ring for retaining the shaft bearing in the shaft channel at an essentially fixed second axial position relative to the shaft channel;

a longitudinal cooling fluid channel through the shaft and through the external hub which cooling fluid channel is in fluid flow communication with a cooling fluid channel in the closure member to thereby enable circulation of a cooling fluid from outside the hub into and through the closure member; and a cooling fluid channel in the housing adjacent the resilient sealing ring for cooling the sealing ring.

19. The valve assembly of claim 18 wherein said axial connection means comprises at least one bolt projecting axially from said hub and threadably received within a threaded opening in said shaft so that said hub is connected to said shaft by an axially directed force to limit imposition of radially directed impact forces upon the shaft associated with connection of the hub to the shaft.

20. A high pressure valve assembly for handling granular materials comprising:

a housing having an inlet and an outlet wherein the ratio of the outlet diameter to inlet diameter is no less than 1:1 and wherein the inlet contains a flanged connector for mating the inlet to a standard pressure-rated flange;

a spherical closure member within the housing;

a valve seat within said housing with which the closure member matably engages in a first position in closing relationship with the outlet;

an elongated shaft drivably connected to the closure member for rotating the closure member about the shaft axis between a second position in an open relationship with the outlet and the first position to facilitate a flow of material therethrough from the inlet to the outlet of the valve assembly by rotation of the shaft to move the closure member between the first and second positions;

an annular recess in the housing adjacent the valve seat containing a resilient inflatable sealing ring, said ring being dimensioned so as to sealably contact the closure member when the closure member is in the first position upon inflation of the ring;

a gas inlet for supplying a gas under pressure to inflate the resilient sealing ring;

a shaft channel in said housing containing a shaft seal and a shaft bearing, said shaft seal and shaft bearing having apertures therein for receiving the shaft therethrough in the shaft channel to provide for sealed rotation of the shaft about the shaft axis with respect to the housing, said shaft having an outer end projecting from the shaft channel with an external hub disposed on the outer end of the shaft and dimensioned and arranged to engage the housing to restrict longitudinal movement of the shaft in the channel, the hub being connected to the outer end of the shaft by axial connection means which engages the hub and shaft together so as to restrict axial movement of one with respect to the other in a manner which limits the imposition of any radially directed impact forces upon the shaft associated with connection of the hub to the shaft;

at least one resilient shaft retaining ring for retaining the shaft in the shaft channel of the housing at an essentially fixed first axial position relative to the shaft channel; and at least one resilient bearing retaining ring for retaining the shaft bearing in the shaft channel at an essentially fixed second axial position relative to the shaft channel.

21. The valve assembly of claim 20 wherein said axial connection means comprises at least one bolt projecting axially from said hub and threadably received within a threaded opening in said shaft so that said hub is connected to said shaft by an axially directed force to limit imposition of radially directed impact forces upon the shaft associated with connection of the hub to the shaft.

22. A valve assembly comprising:

a) a housing having an inlet and an outlet wherein the ratio of the outlet diameter to inlet diameter is no less than 1:1 and wherein the inlet contains a flanged connector for mating the inlet to a standard pressure-rated flange;

a spherical closure member within the housing;

a valve seat within said housing with which the closure member matably engages in a first position in closing relationship with the outlet;

an elongated shaft drivably connected to the closure member for rotating the closure member about the shaft axis between a second position in an open relationship with the outlet and the first position to facilitate a flow of material therethrough from the inlet to the outlet of the valve assembly by rotation of the shaft to move the closure member between the first and second positions;

an annular recess in the housing adjacent the valve seat containing a resilient inflatable sealing ring, said ring being dimensioned so as to sealably contact the closure member when the closure member is in the first position upon inflation of the ring;

a gas inlet for supplying a gas under pressure to the sealing ring to inflate the sealing ring; and a shaft channel in said housing containing a shaft seal and a shaft bearing, said shaft seal and shaft bearing having apertures therein for receiving the shaft therethrough in the shaft channel to provide sealed rotation of the shaft about the shaft axis with respect to the housing, said shaft having an outer end projecting from the shaft channel with an external hub disposed on the outer end of the shaft and dimensioned and arranged so as to engage the housing to restrict longitudinal movement of the shaft in the channel, the hub being connected to the outer end of the shaft by axial connection means which engages the hub and shaft together so as to restrict axial movement of one with respect to the other in a manner which limits the imposition of any radially directed impact forces upon the shaft associated with connection of the hub to the shaft.

23. The valve assembly of claim 22 further comprising at least one resilient shaft retaining ring for retaining the shaft in the shaft channel of the housing at an essentially fixed first axial alignment position within the shaft channel.

24. The valve assembly of claim 22 further comprising at least one resilient bearing retaining ring for retaining the shaft bearing in the shaft channel at an essentially fixed second axial alignment position within the shaft channel.

25. The valve assembly of claim 22 wherein said axial connection means comprises at least one bolt projecting axially from said hub and threadably received within a threaded opening in said shaft so that said hub is connected to said shaft by an axially directed force to limit imposition of radially directed impact forces upon the shaft associated with connection of the hub to the shaft.

* * * * *

UNITED STATES PATENT AND TRADEMARK OFFICE
CERTIFICATE OF CORRECTION

PATENT NO. : 5,642,751
DATED : July 1, 1997
INVENTOR(S) : Michael F. Crawley

It is certified that error appears in the above-indentified patent and that said Letters Patent is hereby corrected as shown below:

Column 1, line 14, change "ba" to -- be --.

Signed and Sealed this

Twenty-first Day of July, 1998

Attest:

Attesting Officer

BRUCE LEHMAN
Commissioner of Patents and Trademarks